United States Patent [19]
Park

[11] Patent Number: 6,072,540
[45] Date of Patent: *Jun. 6, 2000

[54] BRIGHTNESS CONTROL APPARATUS FOR VIDEO DISPLAY APPLIANCE

[75] Inventor: Kwang Ho Park, Kyoungsangbuk-Do, Rep. of Korea

[73] Assignee: LG Electronics, Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/929,439

[22] Filed: Sep. 12, 1997

[30] Foreign Application Priority Data

Sep. 13, 1996 [KR] Rep. of Korea .................. 96-39687

[51] Int. Cl.[7] .............................. H04N 5/57; H04N 5/18
[52] U.S. Cl. ......................... 348/687; 348/688; 348/689
[58] Field of Search .................................. 348/687, 688, 348/689, 806, 807, 745, 746, 747; 315/368.18, 368.21, 368.23, 386; 345/12, 13, 14, 15; H04N 5/57, 5/18, 3/22, 3/26

[56] References Cited

U.S. PATENT DOCUMENTS

| | | |
|---|---|---|
| 3,757,041 | 9/1973 | Thorpe et al. ........................... 348/594 |
| 4,301,472 | 11/1981 | Danos . |
| 4,318,132 | 3/1982 | Machida ................................. 348/229 |
| 4,884,140 | 11/1989 | Park ....................................... 348/615 |
| 4,901,156 | 2/1990 | Yook ...................................... 348/687 |
| 4,916,365 | 4/1990 | Arai ....................................... 315/383 |
| 5,450,138 | 9/1995 | Tomimatsu et al. ................... 348/678 |
| 5,686,969 | 11/1997 | Baik ...................................... 348/556 |

FOREIGN PATENT DOCUMENTS

| | | |
|---|---|---|
| 2206469A | 5/1981 | United Kingdom . |
| 2128846A | 9/1983 | United Kingdom . |

*Primary Examiner*—Andrew I. Faile
*Assistant Examiner*—Vivek Srivastava
*Attorney, Agent, or Firm*—Oppenheimer Wolff & Donnelly LLP

[57] ABSTRACT

A brightness control apparatus for a video display appliance which keeps the brightness of the picture uniformly over the whole screen by determining the amplification rate of the video signal to be displayed at the corners of the screen relatively higher than that to be displayed at its center. The apparatus includes a parabolic wave generator for generating horizontal and vertical parabolic waves corresponding to horizontal and vertical sync signals separated from the video signal, first and second amplifying sections for amplifying the horizontal and vertical parabolic waves outputted from the parabolic wave generator with predetermined amplification rates, respectively, and a signal superimposing section for superimposing the amplified horizontal and vertical parabolic waves with a DC voltage provided from a variable resistor for adjusting the amplification rate of the video signal and providing a superimposed signal to a video amplifying section as an amplification-rate control signal of the video amplifying section.

4 Claims, 3 Drawing Sheets

BRIGHTNESS CONTROL APPARATUS FOR VIDEO DISPLAY APPLIANCE

BACKGROUND OF THE INVENTION

1. Field of the Invention

The present invention relates to brightness control of a video display appliance, and more particularly to a brightness control apparatus for a video display appliance which can keep the brightness of a picture uniformly over the whole screen and thus provide good picture quality.

2. Description of the Related Art

FIG. 1 is a block diagram illustrating the construction of a conventional brightness control apparatus for a video display appliance. Referring to FIG. 1, the conventional brightness control apparatus includes a video amplifying section 1 for amplifying an input RGB (red, green, blue) video signal, a variable resistor VR1 for adjusting the amplification rate of the video amplifying section 1, and a CRT (cathode ray tube) 2 for displaying on its screen the video signal amplified by the amplifying section 1.

The operation of the conventional brightness control apparatus as constructed above will be explained.

When the RGB video signal is inputted to the video amplifying section 1, it is amplified with a predetermined amplification rate by the video amplifying section 1, and then the amplified video signal is outputted to the CRT 2, so that the video signal is displayed on the screen of the CRT 2.

The amplification rate of the video amplifying section 1 is determined by varying the resistance value of the variable resistor VR1. Specifically, as the resistance value of the variable resistor VR1 varies, the voltage supplied from the variable resistor VR1 to the video amplifying section 1 varies, resulting in that the amplification rate of the video amplifying section 1 also varies, and this causes the brightness of the video signal being displayed on the screen of the CRT 2 to be adjusted accordingly.

FIG. 2 is a view illustrating the brightness state of the picture displayed by the conventional brightness control apparatus. As described above, the conventional brightness control apparatus amplifies the input video signal with a predetermined amplification rate and outputs the amplified video signal to the CRT 2. At this time, a user can adjust the brightness of the picture by varying the amplification rate of the video amplifying section 1 by means of the variable resistor VR1.

According to the conventional brightness control apparatus, however, the picture displayed at the center portion of the screen becomes brighter than that at its corner portions due to the difference in deflection angle between the center and the corner portions. Specifically, since the distance between an electron gun of the CRT 2 and each corner portion of the screen is relatively longer than that between the electron gun and the center portion of the screen, the picture displayed at each corner portion becomes relatively darker than that displayed at the center portion. Especially, such a difference in brightness of the screen portions is greatly intensified in a CRT having a large-sized screen and thus this causes the quality of the picture displayed on the CRT to deteriorate.

SUMMARY OF THE INVENTION

It is an object of the present invention to solve the problems involved in the related art, and to provide a brightness control apparatus for a video display appliance which can keep the brightness of the picture uniformly over the whole screen and thus provide a good picture quality by setting the amplification rate of the picture signal displayed at the corner portions of the screen relatively higher than that displayed at its center portion.

It is another object of the present invention to provide a brightness control apparatus for a video display appliance which can be suitably adopted to a large-screen CRT that has a serious problem of the brightness difference of the screen, to provide good picture quality.

In order to achieve the above objects, there is provided a brightness control apparatus for a video display appliance having a video amplifying section for amplifying an input video signal to provide the amplified video signal to a CRT, and a variable resistor for adjusting the amplification rate of the video amplifying section, the brightness control apparatus comprising:

a parabolic wave generator for generating a horizontal parabolic wave corresponding to a horizontal sync signal separated from the video signal, and a vertical parabolic wave corresponding to a vertical sync signal separated from the video signal;

a first amplifying section for amplifying the horizontal parabolic wave generated from the parabolic wave generator with a first amplification rate;

a second amplifying section for amplifying the vertical parabolic wave generated from the parabolic wave generator with a second amplification rate; and a signal superimposing section for superimposing both the horizontal and vertical parabolic waves amplified by the first and second amplifying sections, respectively, with a DC voltage outputted from the variable resistor to provide a superimposed signal to the video amplifying section.

BRIEF DESCRIPTION OF THE DRAWINGS

The above objects, other features, and advantages of the invention will become more apparent by describing the preferred embodiment thereof with reference to the accompanying drawings, in which.

DETAILED DESCRIPTION OF THE PREFERRED EMBODIMENT

Figure 1:
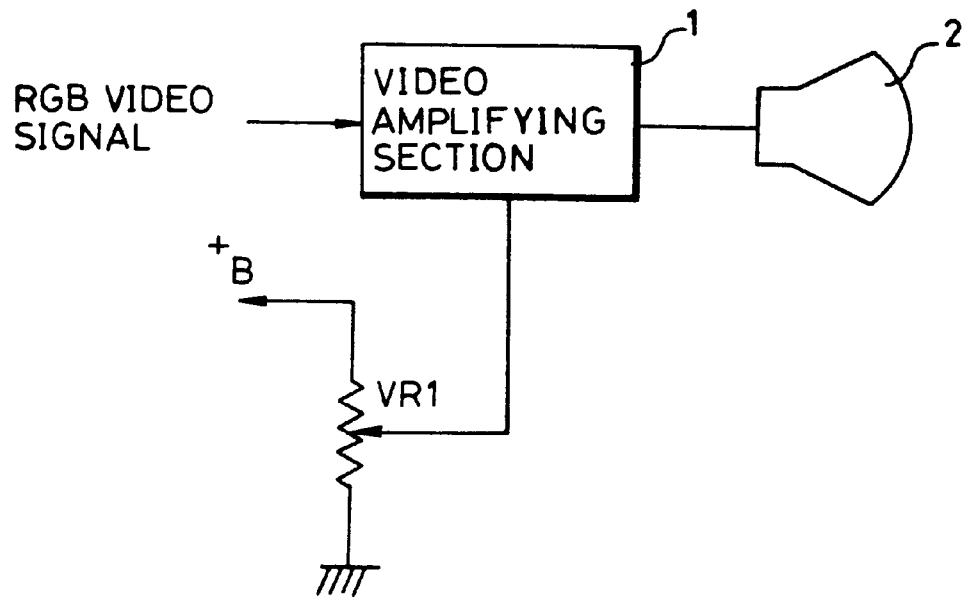
FIG. 1 is a block diagram illustrating the construction of a conventional brightness control apparatus for a video display appliance.
Figure 2:
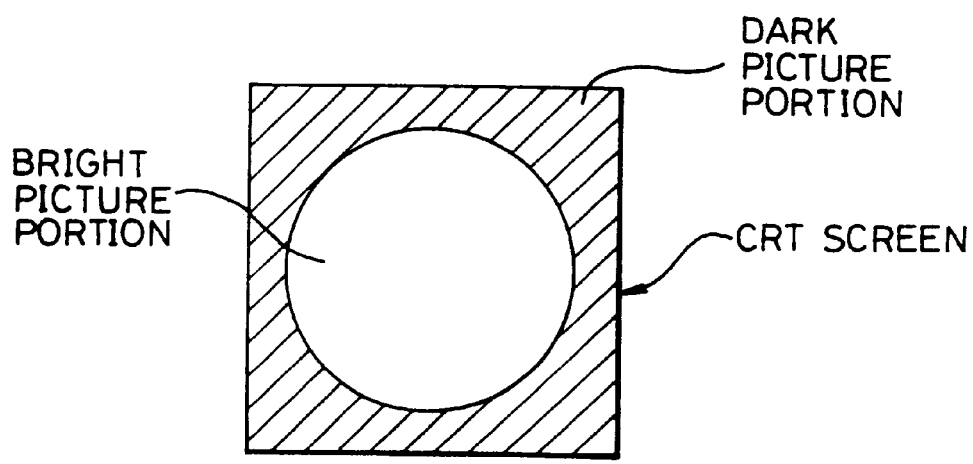
FIG. 2 is a view illustrating the brightness state of the picture displayed on the CRT according to the conventional brightness control apparatus of FIG. 1.
Figure 3:
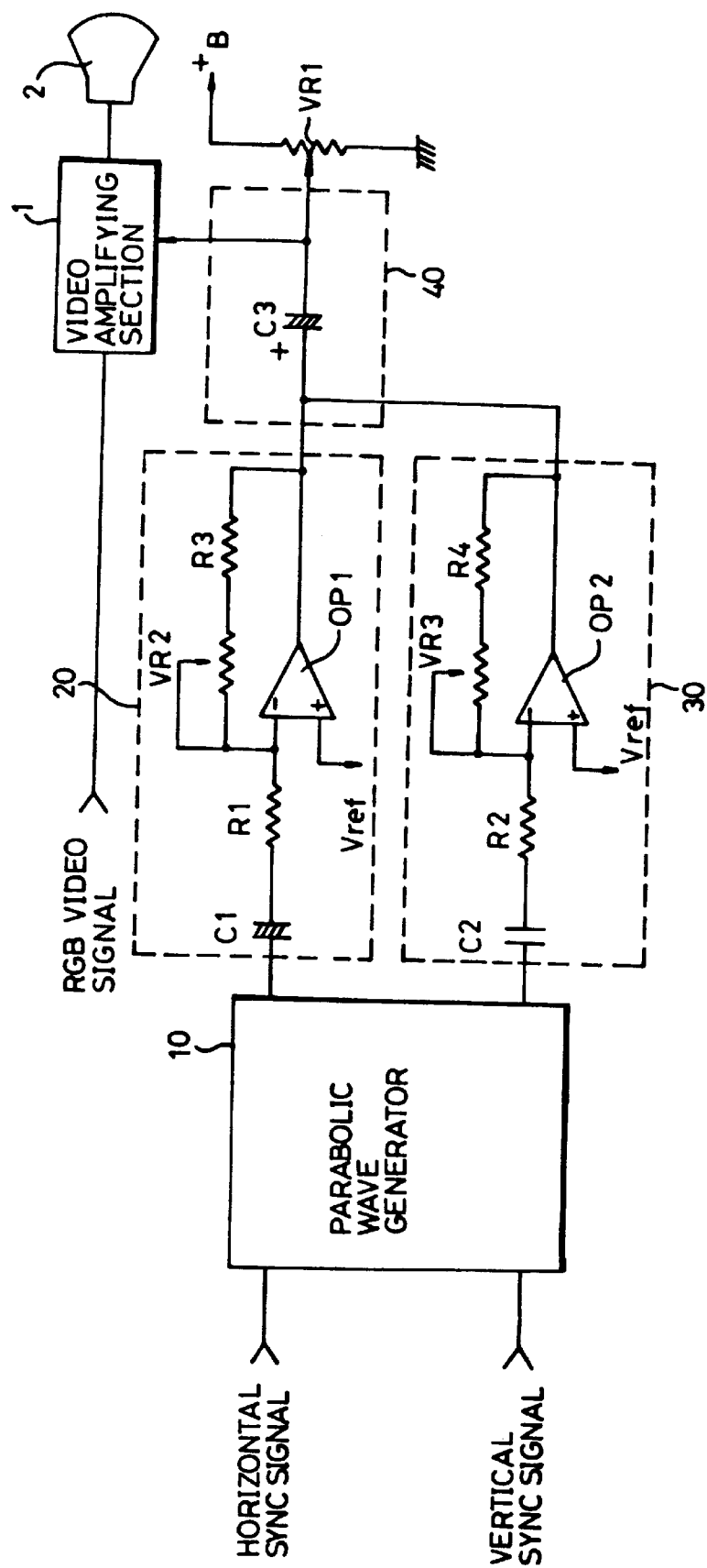
FIG. 3 is a block diagram illustrating the construction of the brightness control apparatus for a video display appliance according to the present invention.

FIG. 3 is a block diagram showing the construction of the brightness control apparatus for a video display appliance according to the present invention.

Referring to FIG. 3, the brightness control apparatus according to the present invention includes a video amplifying section 1 for amplifying an input RGB video signal, a variable resistor VR1 for adjusting the amplification rate of the video amplifying section 1, and a CRT 2 for displaying on its screen the video signal amplified by the amplifying section 1.

The brightness control apparatus according to the present invention also includes a parabolic wave generator 10 for generating a horizontal parabolic wave which corresponds to a horizontal sync signal separated from the RGB video signal and a vertical parabolic wave which corresponds to a vertical sync signal separated from the RGB video signal, a first amplifying section 20 for amplifying the horizontal parabolic wave outputted from the parabolic wave generator 10 with a first amplification rate, a second amplifying section 30 for amplifying the vertical parabolic wave outputted from the parabolic wave generator 10 with a second amplification rate, and a signal superimposing section 40 for superimposing the horizontal and vertical parabolic waves amplified by and outputted from the first and second amplifying sections 20 and 30, respectively, with a DC voltage outputted from the variable resistor VR1 to provide the superimposed signal to the video amplifying section 1.

The first amplifying section 20 includes an operational amplifier OP1 for amplifying the horizontal parabolic wave, and a variable resistor VR2, coupled to the operational amplifier OP1 for determining the first amplification rate of the operational amplifier OP1.

The second amplifying section 30 includes an operational amplifier OP2 for amplifying the vertical parabolic wave, and a variable resistor VR3, coupled to the operational amplifier OP2, for determining the second amplification rate of the operational amplifier OP2.

Also, the signal superimposing section 40 comprises a capacitor C3 for superimposing the amplified horizontal and vertical parabolic waves amplified by the operational amplifying sections 30 and 40, respectively, with the DC output voltage of the variable resistor VR1 and providing the superimposed signal as an amplification-rate control signal of the video amplifying section 1.

In the drawing, the reference numerals C1 and C2 denote coupling capacitors, R1 to R4 denote resistors, and Vref denotes a reference voltage inputted to the operational amplifiers OP1 and OP2.

The operation of the brightness control apparatus according to the present invention as constructed above will now be explained with reference to FIGS. 3, 4A to 4C.

First, when the RGB video signal is inputted to the video amplifying section 1, it is amplified with the amplification rate determined in accordance with the amplification-rate control signal inputted to the amplification-rate control terminal CT of the video amplifying section 1, and then the amplified video signal is outputted to the CRT 2, so that a picture having the brightness which corresponds to the amplification rate is displayed on the screen of the CRT 2.

Figure 4A:
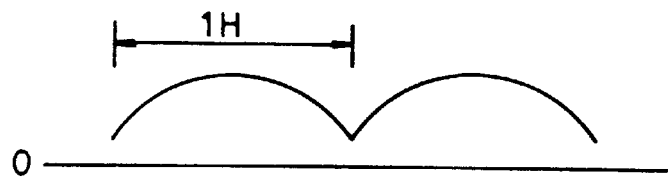
FIGS. 4A to 4C are waveform diagrams appearing at various points of FIG. 3.

The parabolic wave generator 10 generates the horizontal parabolic wave which corresponds to the horizontal sync signal separated from the RGB video signal as shown in FIG. 4A, and outputs the horizontal parabolic wave to the inverting (−) terminal of the operational amplifier OP1 in the first amplifying section 20. This operational amplifier OP1 amplifies the horizontal parabolic wave inputted thereto with the first amplification rate determined by the variable resistor VR2, and outputs the amplified horizontal parabolic wave to the capacitor C3 of the signal superimposing section 40.

Figure 4B:
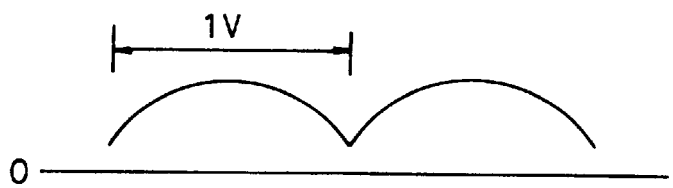

At the same time, the parabolic wave generator 10 generates the vertical parabolic wave which corresponds to the vertical sync signal separated from the RGB video signal as shown in FIG. 4B, and outputs the vertical parabolic wave to the inverting (−) terminal of the operational amplifier OP2 in the second amplifying section 30. This operational amplifier OP2 amplifies the vertical parabolic wave inputted thereto with the amplification rate determined by the variable resistor VR3, and outputs the amplified vertical parabolic wave to the capacitor C3 of the signal superimposing section 40.

The horizontal and vertical parabolic waves outputted from the operational amplifiers OP1 and OP2, respectively, are superimposed and filtered through the capacitor C3 so that the DC component of the superimposed horizontal and vertical parabolic signal is removed. The filtered horizontal and vertical parabolic signal is then superimposed with the DC voltage A outputted from the variable resistor VR1, and then the superimposed signal is outputted to the amplification-rate control terminal CT of the video amplifying section 1.

Figure 4C:
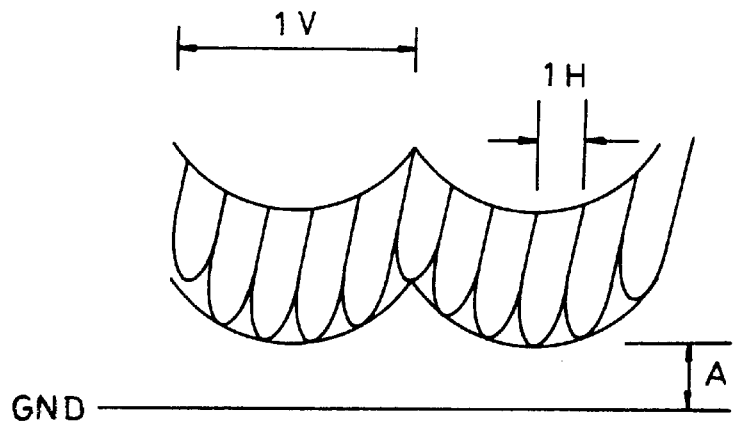

FIG. 4C illustrates the superimposed signal wherein the DC voltage A, the horizontal and vertical parabolic waves are superimposed together through the capacitor C3. Referring to FIG. 4C, the superimposed horizontal and vertical parabolic signal, which are composed of the horizontal parabolic wave component and the vertical parabolic wave component, has risen from the level of the DC voltage A.

The superimposed voltage waveform of FIG. 4C is inputted to the amplification-rate control terminal CT of the video amplifying section 1, and thus the video amplifying section 1 amplifies the input video signal with the amplification rate which corresponds to the superimposed voltage waveform. Specifically, the video signal to be displayed at the corner portions of the screen is amplified with the amplification rate which is relatively higher than that of the video signal to be displayed at the center portion of the screen, resulting in that the brightness of the picture becomes uniform over the whole screen of the CRT 2, thereby improving the picture quality. At this time, a user may properly adjust the variable resistors VR2 and VR3 in the first and second amplifying sections 20 and 30 to obtain the optimum picture state.

From the foregoing, it will be apparent that the brightness control apparatus according to the present invention provides the advantages that it can keep the brightness of the picture uniformly over the whole screen of the CRT and thus provide a good picture quality by determining the amplification rate of the video signal displayed at the corner portions of the screen relatively higher than that displayed at its center portion. Especially, the present invention can be suitably adopted to a CRT having a large screen.

While the present invention has been described and illustrated herein with reference to the preferred embodiment thereof, it will be understood by those skilled in the art that various changes in form and details may be made therein without departing from the spirit and scope of the invention.

What is claimed is:

1. A brightness control apparatus for a video display appliance receiving an input video signal, the brightness control apparatus comprising:

a parabolic wave generator for generating a horizontal parabolic wave corresponding to a horizontal sync signal separated from the video signal, and a vertical parabolic wave corresponding to a vertical sync signal separated from the video signal;

a first variable amplifying section for amplifying the horizontal parabolic wave generated from the parabolic wave generator and being variable by a user of the apparatus;

a second variable amplifying section for amplifying the vertical parabolic wave generated from the parabolic wave generator and being variable by a user of the apparatus;

a signal superimposing section for superimposing both the horizontal and vertical parabolic waves amplified by the first and second amplifying sections, respectively, with a DC voltage outputted from a variable resistor to provide a superimposed signal; and a video amplifying section for amplifying said superimposed video signal and outputting said amplified superimposed video signal to a CRT.

2. A brightness control apparatus as claimed in claim 1, wherein the first variable amplifying section comprises:

an operational amplifier for amplifying the horizontal parabolic wave; and a variable resistor, coupled to the operational amplifier, for determining the amplification rate of the operational amplifier.

3. A brightness control apparatus as claimed in claim 1, wherein the second variable amplifying section comprises:

an operational amplifier for amplifying the vertical parabolic wave; and a variable resistor, coupled to the operational amplifier, for determining the amplification rate of the operational amplifier.

4. A brightness control apparatus as claimed in claim 1, wherein the signal superimposing section comprises a capacitor for superimposing the horizontal and vertical parabolic waves amplified by the first and second variable amplifying sections, respectively, with the DC voltage outputted from the variable resistor, and providing the superimposed signal to an amplification-rate control terminal of the video amplifying section.

* * * * *